United States Patent [19]
Van Lerberghe

[11] Patent Number: 5,955,217
[45] Date of Patent: Sep. 21, 1999

[54] THIN CARD INCLUDING A FLAT BATTERY AND CONTACT MEANS

[75] Inventor: Steven Van Lerberghe, Le Mans, France

[73] Assignee: U.S. Philips Corporation, New York, N.Y.

[21] Appl. No.: 08/873,262

[22] Filed: Jun. 11, 1997

[30] Foreign Application Priority Data

Jun. 19, 1996 [FR] France .................................. 96 07633

[51] Int. Cl.⁶ ............................. H01M 2/06; H01M 2/02
[52] U.S. Cl. ........................... 429/162; 429/170; 429/98
[58] Field of Search ................................... 429/162, 170, 429/178, 179, 180, 181, 233, 234, 98

[56] References Cited

U.S. PATENT DOCUMENTS

| | | | |
|---|---|---|---|
| 3,050,576 | 8/1962 | Comanor | 136/6 |
| 4,059,718 | 11/1977 | Messing | 429/162 |
| 5,114,807 | 5/1992 | Rowlette | 429/152 |
| 5,521,024 | 5/1996 | Sasaki et al. | 429/162 |
| 5,580,678 | 12/1996 | Rossoll | 429/163 |
| 5,591,540 | 1/1997 | Louie et al. | 429/163 |

FOREIGN PATENT DOCUMENTS

| | | | |
|---|---|---|---|
| 1252536 | 4/1960 | France . | |
| 60-7056 | 1/1985 | Japan | H01M 2/02 |

OTHER PUBLICATIONS

Patent abstract of Japan vol. 014,No.444 (E–0982), Sep. 21, 1990.

*Primary Examiner*—Maria Nuzzolillo
*Assistant Examiner*—Carol Chaney
*Attorney, Agent, or Firm*—Dicran Halajian

[57] ABSTRACT

A battery is disclosed having a frame with conducting parts which are separated by insulating parts to form a cavity. The battery includes a cell located in the cavity having electrodes connected to the conducting parts. An insulating cover foil covers the cell. The conducting parts extend substantially along two sides of the frame. In addition, an insulating foil is located over inner surfaces of the conducting parts, where the inner surfaces face toward the cavity. Instead a single cell, many cells may be provided in the cavity, where the cells are vertically stacked over one another connected either in parallel or in series.

17 Claims, 3 Drawing Sheets

THIN CARD INCLUDING A FLAT BATTERY AND CONTACT MEANS

FIELD OF THE INVENTION

The invention relates to a thin card including a flat electric battery and contact means.

The invention is used in portable apparatuses and particularly in telephone terminals.

BACKGROUND OF THE INVENTION

A flexible thin card including an electric battery element is known from Japanese Patent Application JP 60-7056, no. 58-114925 of Jun. 25, 1983, published on Jan. 14, 1985 (Tomoyuki Aoki). This card comprises first and second rectangular, flat and flexible cover foils below and above a flat battery. These foils are positioned face to face and sealed to each other by means of a joint consisting of a sealing material provided in between the foils and at their edges. The battery is arranged in the cavity created by this sealing joint and comprises first and second electrodes in the form of conducting foils, one of which is lengthened and constitutes an external contact lug between the sealing joint and the first cover foil at an extremity of the rectangle, and the other is lengthened and constitutes another external contact lug between the sealing joint and the second cover foil. The sealing operation by means of the joint is realized by gluing or fusion, using ultraviolet radiation, or in a high-frequency electric field eliminating alien particles which might otherwise render the sealing non-impervious.

SUMMARY OF THE INVENTION

There is a need for a thin flexible card including a battery, where the card is strong enough for easy placement in a wireless apparatus and has freely available zones of electrical contacts.

This problem is solved by using a thin card including a flat electric battery and contact means, comprising:

first and second cover foils, a sandwich frame sealed to said cover foils at their periphery, said frame having a central cavity, a flat battery element arranged in the central cavity of the frame, having electrodes of opposite polarity, wherein:

the first and second cover foils are made of an insulating synthetic material, and the sandwich frame comprises parts made of a conducting material. The conducting metallic parts sealed to the electrodes of opposite polarity and are mutually insulated by parts of said sandwich frame of insulating material to which they are sealed.

The metallic parts of the sandwich frame form electric contacts which are cathode and anode current collectors of the battery having a low electric resistance and a satisfactory mechanical resistance allowing a free electric connection.

This thin card has the advantage that it is robust due to the presence of the metallic material parts of the sandwich frame. The thin card can thus be easily inserted into a wireless apparatus and its quasi-stiffness allows the card to be slid into the apparatus and maintain it easily.

DESCRIPTION OF PREFERRED EMBODIMENTS

Figure 3A:
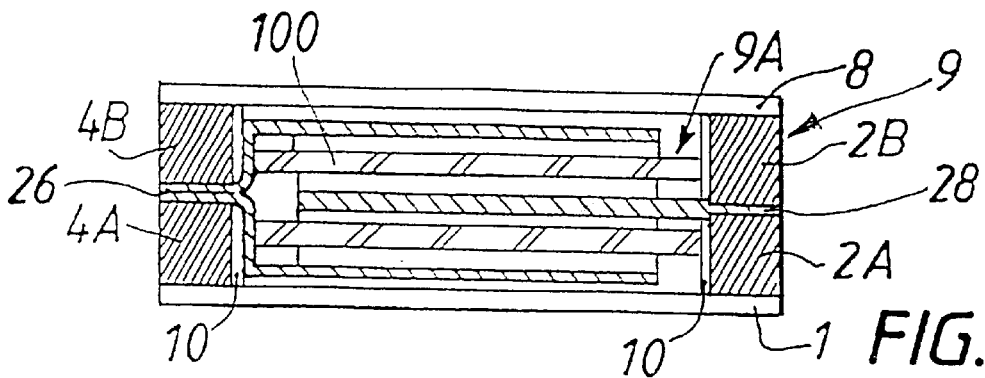
FIG. 3A is a sectional view of an electrochemical element shown in FIG. 2A, mounted in a first thin-card type.
Figure 3B:
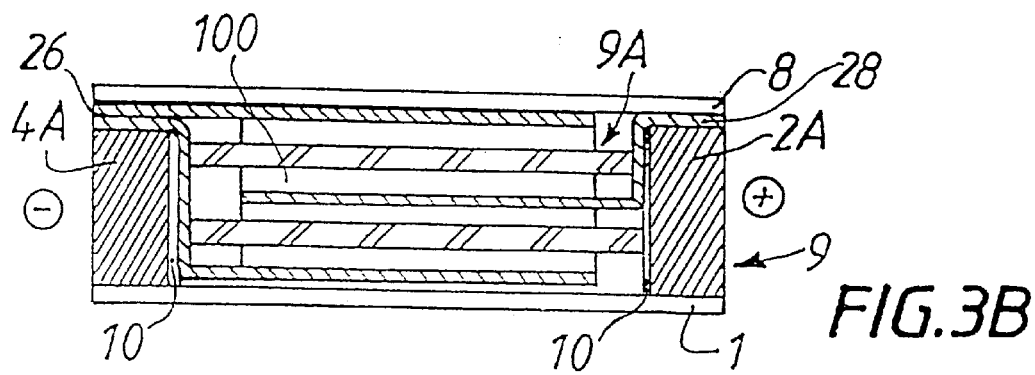
FIG. 3B is a sectional view of such an element mounted in a second thin-card type.

As is shown in FIGS. 1A–1D and in FIGS. 3A, 3B, a thin card including at least an electrochemical element comprises:

a first cover foil 1 referred to as lower plane wall;

a second cover foil 8, referred to as upper plane wall;

a sandwich frame 9 sealed to said upper and lower plane walls at their internal periphery, which frame has an internal cavity 9A;

a flat battery element 100 arranged in the central cavity 9A of the sandwich frame 9 and having dimensions which are suitable to accommodate said element 100 which is constituted by an electrochemical cell having electrodes 26 and 28 of opposite polarity.

The first and second plane walls 1, 8 are made of a semi-rigid insulating material which may be a polyvinyl chloride (PVC), or an acrylonitrile butadiene styrene (ABS) in the form of molded or laminated multilayers. The material used for these first and second plane walls should have several qualities. It must be possible to seal it to the metallic materials or to other synthetic materials. It must be inert with respect to the material constituting the battery element. It must be impervious to the material constituting this battery element and also impervious to the materials in its vicinity.

Generally speaking, one or several portions of the sandwich frame 9 may extend beyond the periphery of one or of the two cover foils 1, 8.

The sandwich frame 9 comprises parts 2A, 2B and 4A, 4B of a conducting material connected to the electrodes 26 and 28, respectively, of the battery element.

Figure 1A:
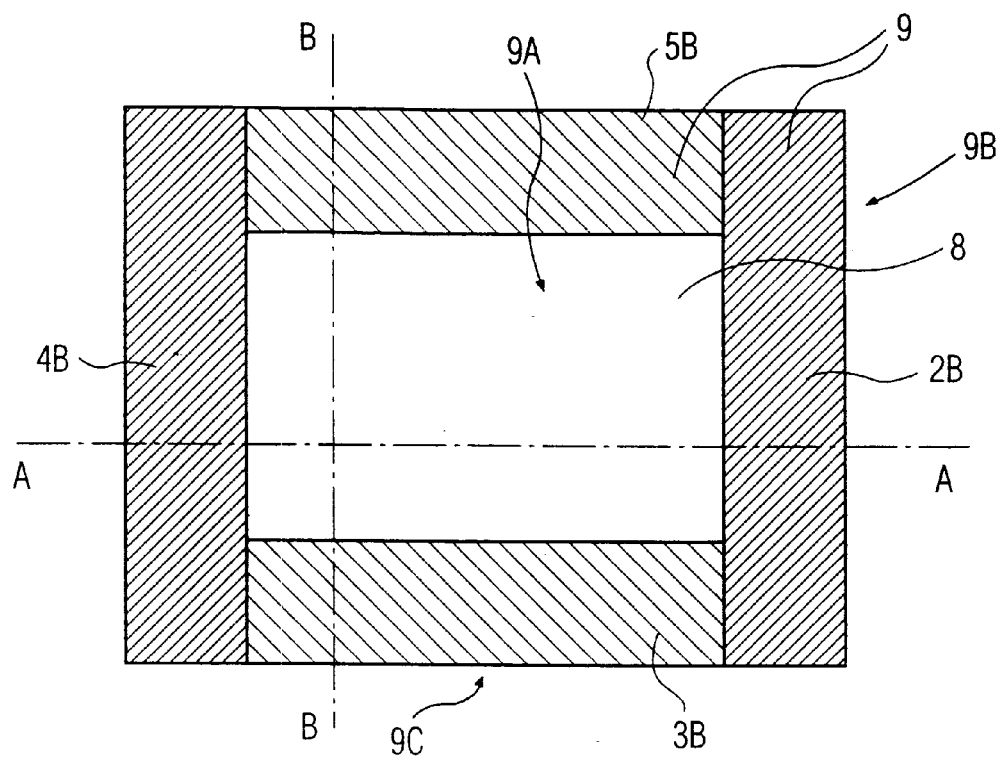
FIG. 1A is a plan view of a part of the thin card.
Figure 1B:
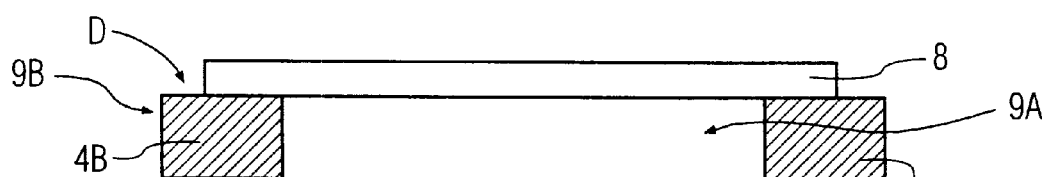
FIG. 1B is a section taken on the line AA in FIG. 1A.

In FIGS. 1A–1B and 3A, the parts 2A, 2B and 4A, 4B of the sandwich frame of conducting material are preferably arranged at the edges of the upper and lower walls substantially throughout the length or width of these walls.

Figure 1C:
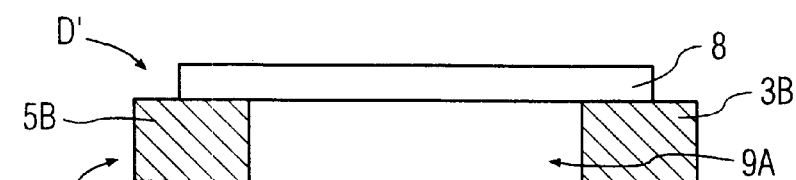
FIG. 1C is a section taken on the line BB in FIG. 1A.

In FIGS. 1A and 1C, the upper insulating parts 3B and 5B, as well as the lower insulating parts which are below and aligned with the upper insulating parts 3B and 5B, are then arranged along the other edges of these walls.

At least portions of the conducting parts 2A, 2B and 4A, 4B of the sandwich frame, shown in FIGS. 1A–1C and 3A, form external contact zones of the thin card. For this purpose, external surfaces 9B advantageously extend beyond the periphery of the cover foils 1,8 by a dimension D.

The dimension D of the external contact zones may have any value which is appropriate to enhance the quality of electrical contacts constituted by these portions of the sandwich frame. Also, the value of the dimension D may be such that the portions of the sandwich frame which extend beyond the periphery of the cover foils, constitute protrusions to form sliding means for sliding the thin card grooves, or to form setting means for steadying the thin card in a housing.

Similarly, as shown in FIG. 1C, external surfaces 9C of portions of the upper insulating parts 3B and 5B of the sandwich frame, as well as corresponding portions of the lower insulating parts which are located below and aligned with the upper insulating parts 3B and 5B, may constitute protrusions extending beyond the periphery of the cover foils and having a dimension D'.

In FIGS. 1A, 1B, 1C and 3A, the sandwich frame consists of two parts. An upper first part 2A, 3A, 4A, 5A of this sandwich frame is sealed to the lower wall 1, constituting a part 2B, 3B, 4B, 5B of this sandwich frame is sealed to the upper wall 8 of the thin card, and a corresponding lower part of the sandwich frame is sealed to the lower wall 1 of the thin card, where a portion of the lower part is shown in FIG. 3A by references 2A and 4A, and the remaining lower portions are below and aligned with the corresponding upper portions 3B, 5B shown in FIG. 1A.

As shown in FIGS. 1A–1D and 3A, for the installation of the thin card, the electrochemical cell 100 is arranged in the cavity 9A of the lower part of the thin card. The electrodes 26 and 28 of this electrochemical cell 100 are fixed on the conducting parts 4A, 2A, respectively, of the lower part of the sandwich frame by means of any sealing method which is compatible with the use of the materials for the conducting parts 4A, 2A and the electrodes 26, 28. The upper part of the thin card is placed with its upper wall 8 at the top and with the upper part 2B, 3B, 4B, 5B of the sandwich frame facing the first part lower part of this frame, partially shown as references 2A, 4A. In this arrangement, the parts of conducting material of the first and second parts of the sandwich frame are arranged opposite each other so that the parts of insulating material of the two parts of the sandwich frame also face each other. The two parts of the sandwich frame are then imperviously fixed to each other.

The conducting material of the sandwich frame should be compatible with the metal of the electrodes of the electrochemical element. Compatible is herein understood to mean that this material must not provoke secondary chemical reactions when it is electrically connected to the material of the electrode. These parts of conducting material of the sandwich frame are capable of constituting anode and cathode current collectors. If the conducting material of the frame differs from that of the electrodes, the problems of incompatibility with the metal of the electrodes are prevented by providing an insulating synthetic cladding positioned at 10 (FIGS. 3A–3B) on the conducting parts 2A, 2B, 4A, 4B of the frame opposite the cavity accommodating the electrochemical cell.

The conducting material of the frame may be a metal such as steel, for example provided with a synthetic cladding on its inner face 10, or a synthetic insulating conductor on the wall 10 of the cavity accommodating the electrochemical cell. The insulating material of the parts (partially shown as references 3B and 5B in FIGS. 1A, 1C) of the frame may be a thermosolderable or a thermosetting synthetic material. These synthetic materials have the property that they can be sealed to other synthetic materials and metals. Other insulating materials may be chosen, such as polyethylenes, polypropylenes, ethylene copolymers and the acrylic and methacrylic acids. The insulating material of the frame may also be constituted by a polysiloxane joint (silicon).

The sealing of synthetic materials to each other or to metals is well-known to those skilled in the art from the publication: "Plastic Engineering Handbook", Society of Plastics Industry Inc., 3rd edition, Reinhold Book Corporation, New York, USA.

Certain synthetic materials have the property that they can be hot-sealed to metallic surfaces without using an adhesive or without necessitating any other pretreatment than a cleaning operation. In certain cases, a pretreatment of the metal is necessary. Other insulating materials for realizing the sandwich frame require an adhesive for sealing the synthetic material to the metal. Epoxy resins or acrylic glues are suitable as adhesives for sealing the synthetic materials to each other or to metal. In this case, the epoxy resin may also serve as an insulating layer between the conducting material of the frame and the cavity accommodating the electrochemical cell.

The synthetic materials may be extruded to form a film which may subsequently be laminated. The parts of the sandwich frame are perforated from a synthetic material foil with the aid of a punch whose shape depends on the shape desired for the battery element. The metallic parts of the frame are also available in various thicknesses in the form of flat strips and may be cut up in the same way as the synthetic material films. A metallic strip must be cleaned and degreased before it can be used for mounting the sandwich frame of the thin card. The thickness of the elements of the sandwich frame generally depends on the thickness of the battery element arranged in the cavity of this sandwich frame.

Figure 1D:
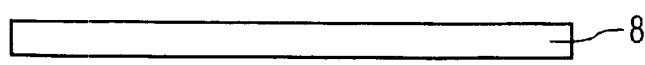
FIG. 1D is a sectional view of another part of a thin card.

As is shown in FIGS. 1A, 1B, 1C and 1D, and in FIG. 3B, the sandwich frame 9 has only a single part formed by the parts 2A, 4A of conducting material and the parts 3B, 5B of insulating material sealed to the lower wall 1. The sandwich frame has an appropriate height to form a cavity 9A which is suitable for accommodating a flat battery element 100. When the flat battery element 100 is positioned in this cavity 9A, with its electrodes 26, 28 fixed to the conducting parts of the sandwich frame, a single upper wall 8 as shown in FIG. 1D will seal the thin card thus formed. The conducting parts 2A, 4A of the sandwich frame 9 may be coated with an insulating layer positioned at 10, opposite the cavity 9A accommodating the flat battery element 100, as described in reference to FIG. 3A.

Products for manufacturing battery elements are well-known to those skilled in the art from the publication: "Handbook of Batteries", 2nd edition, David Lindon. It is known from this document that lead-acid batteries have high qualities of power and rechargeability, i.e. this type of battery is rechargeable and the charge is stable during a considerable period of time.

Figure 2A:
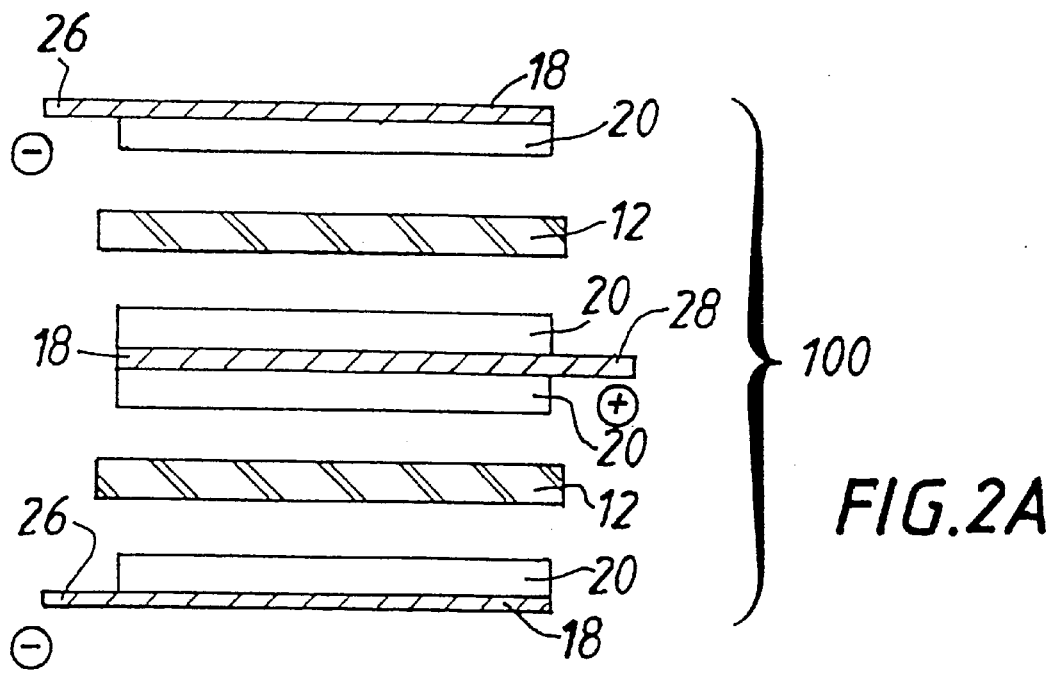
FIG. 2A is an exploded view of an electrochemical element.

In FIG. 2A, an electrochemical cell of the lead-acid type which is capable of realizing a flat battery element comprises: ultra-thin films 18 of an electrochemically active metal, generally of lead or nickel, a cladding consisting of an electrochemically active compound 20 on one face or on two faces of said active metal films, a separating material for absorbing an electrolyte contained in the sealed system constituting the thin card which encloses the electrochemical cell.

The association of the active metal films 18 with the active compound cladding 20 constitutes plates of a negative or positive polarity which are separated from each other by the separating material 12.

Projections 26 and 28 of the films 18 are not clad with an active compound 20 so as to realize electric contacts. The separator 12 extends beyond the compound-clad parts of each positive and negative plate. The positive and negative plates are arranged in such a way that the unclad parts for forming the contacts alternate with each other.

FIG. 2A shows a negative plate which is constituted by a metallic layer 18 and a contact zone 26, and is clad with a compound 20 on one face. This first negative electrode is separated from a positive electrode by the separator 12. The positive electrode comprises a thin metallic film 18 and a contact 28, and is clad with the compound 20 on its two faces. This positive electrode, with contact 28, is separated from the next negative electrode by a separator 12. The next negative electrode is constituted by a metallic film 18, with contact 26, and a compound cladding 20 facing the separator 12. Such a cell 100 thus comprises two negative plates and one common positive plate, thus constituting two elementary cells arranged substantially parallel and having a common electrode.

Figure 2B:
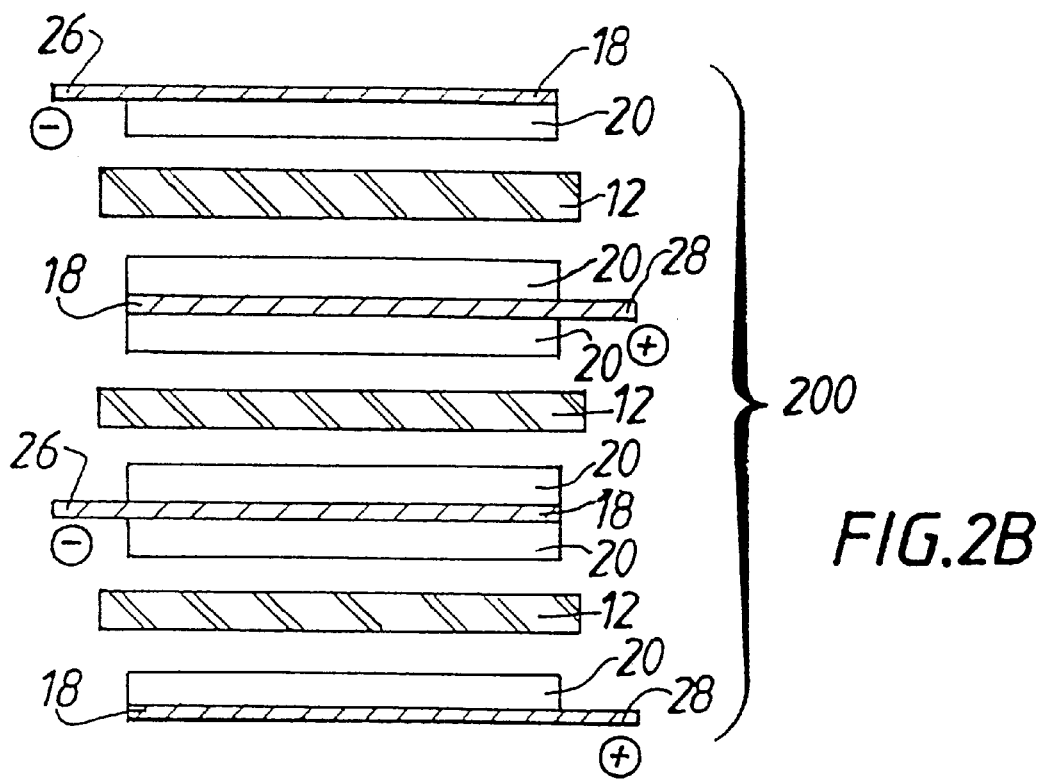
FIG. 2B is an exploded view of another electrochemical element.

As is shown in FIG. 2B, an electrochemical cell 200 comprises an upper negative plate whose side facing the interior of the electrochemical cell is clad with an active compound 20, a separator 12, a positive plate whose two faces are clad with a compound, a separator, a negative plate whose two faces are clad with a compound, a separator and a positive plate, one face of which is clad with a compound, thus constituting three elementary cells arranged substantially parallel and having twice a common electrode of the same polarity.

In a lead-acid system, the film 18 preferably consists of 99.99% of lead. For a lead-acid electrochemical cell, there are a many active compounds which are already known in the art. For example, $PbO$ and $Pb_3O_4$ compounds may be used for the positive plates and $PbO$ compounds may be used for the negative plates. The separator may be made of highly absorbing glass fibers. The electrolyte is sulfuric acid. The electrolyte concentration in the cell is established by adding an excess of electrolyte. An exhaust system may be provided in the cell for eliminating the excess gases when the internal pressure exceeds a certain level. In the lead-acid electrochemical cell, the electrolyte is in a substantially saturated state and a certain internal pressure which is higher than the atmospheric pressure should be maintained in the normal state of operation of the cell. In the thin card, an electrochemical cell of the type shown in FIGS. 2A and 2B is maintained in such a way that the volume between the compressed separator and the active material is substantially filled up and that there is no free electrolyte.

An advantage of these electrochemical cells is that they have a very large number of charge and discharge cycles. These cells may be recharged at a higher rate as compared with other known cells.

FIG. 3A is a sectional view of an electrochemical cell 100, shown in FIG. 2A, which is mounted in a thin card whose sandwich frame consists of two parts.

FIG. 3B shows a cell 100, as in FIG. 2A, mounted in a thin card whose sandwich frame 2A, 4A consists of a single part.

In embodiments of the electrochemical cells, the active zones of the electrodes had dimensions of approximately 44 mm by 57 mm; the positive two-layer plate had a thickness of 0.254 mm; the one-layer negative or positive plate had a thickness of 0.152 mm; the separator at a pressure of 55 g per $m^2$ had a thickness of 0.191 mm. This led to a cell 100 which had a thickness of approximately 1 mm and a cell 200 which had a thickness of approximately 1.3 mm. Each of these lead-acid cells was capable of operating at a voltage of 2 V.

To obtain an operation of, for example 6 V, several structures built on the structure of the preceding thin card may be connected in series.

Figure 3C:
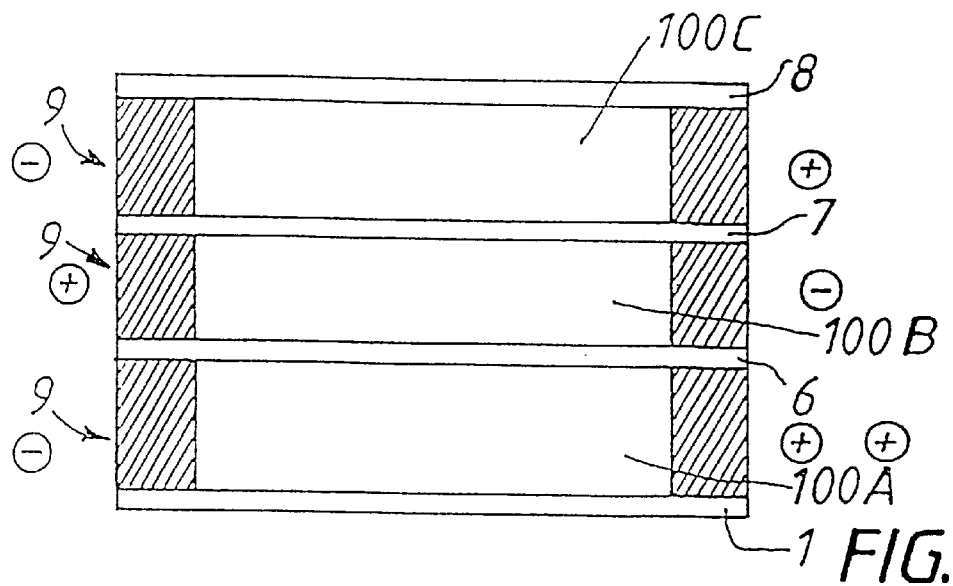
FIG. 3C is a sectional view of an assembly for arranging several electrochemical elements in series, constituting a third thin-card type.

Such a system is shown in FIG. 3C. This system comprises walls 1, 6, 7, 8 of the same type as the lower walls and upper walls described hereinbefore, and sandwich frames 9 arranged between these walls with cavities 9A each accommodating electrochemical cells 100A, 100B, 100C, respectively. These structures are connected together and sealed in the manner as described hereinbefore. The intermediate walls 6 and 7 may be thinner than the lower and upper walls 1 and 8 and may be made of an insulating material of a different type. An essential condition for building this structure of several cells is the imperviousness between the electrochemical cells.

In the embodiment shown in FIG. 3C, a battery of 6V is obtained by stacking the three structures in such a way that the positive output of the second, or intermediate, structure 100B faces the negative outputs of the first structure 100A and the third structure 100C. The result is that the negative output of this second structure 100B faces the positive output of the first structure 100A and the third structure 100C. It is then easy to connect these three structures electrically in series in a manner known to those skilled in the art, for example by connecting the + terminal of the first structure 100A to the − terminal of the second structure 100B, and then connecting the + terminal of the second structure 100B to the − terminal of the third structure 100C.

Other connections between these structures may be realized, dependent on the envisaged purpose, for example, to achieve parallel connections.

Figure 3D:
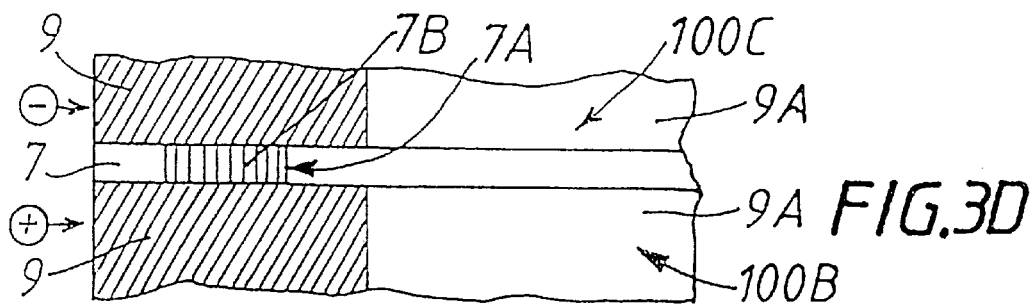
FIG. 3D is a sectional view of a method of providing the intermediate cover foils with apertures for connecting the thin-card structures in series.

The intermediate foils 6, 7 shown in FIG. 3C may have apertures, such as the aperture 7A shown in FIG. 3D. These apertures are flush with the facing sandwich frames for establishing contact between the metallic parts of the sandwich frames 9 of the different structures, which apertures may be filled up with metal or a synthetic conducting material, constituting small conducting pins shown as references 7B in FIG. 3D, for establishing electric contact between a lower sandwich frame and the upper sandwich frame. This arrangement of conducting pins 7B is realized during stacking of the structures when the apertures 7A are provided in advance in the foils 6 and 7 (FIG. 3C). This arrangement does not deteriorate the imperviousness of the card to the electrochemical cells.

In an embodiment which is not shown, the electric connection may be made by an external conductive layer or an external connector connecting external parts 9B (FIG. 1B) of the sandwich frame, which have to be connected electrically. The other parts may be protected by an insulating or a synthetic material coating.

Figure 4:
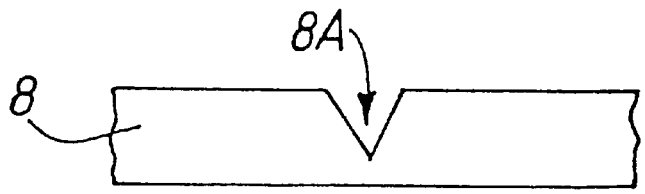
FIG. 4 is a sectional view of an anti-explosion safety groove provided in a cover foil.

With reference to FIG. 4, showing the embodiment in which the thin card includes a lead-acid battery element, safety means must be provided because the electrochemical element is normally under a pressure which is higher than the atmospheric pressure. These safety means prevent an occasional possibility of explosion. In an embodiment, they are constituted by one or several grooves 8A in the upper wall 8 or the lower wall 1 of the thin card. If the card were submitted to an excessive pressure, it could be inflated and cause such a groove to open without exploding, even if the lower and upper walls of the card are sufficiently thick to be semi-rigid.

In another embodiment of safety system, an exhaust may be realized by means of an aperture of very small dimensions at the location of a seal between two parts of the thin card.

I claim:

1. A card including a flat electric battery and contact means, comprising:

first and second cover foils, a frame sealed to said cover foils at their periphery, said frame having a central cavity, a flat battery element arranged in the central cavity of the frame, having electrodes of opposite polarity, wherein the first and second cover foils are made of an insulating synthetic material, the frame comprises parts made of a conducting material, which are sealed to the electrodes of opposite polarity and are mutually insulated by parts of said frame of insulating material, and the parts of the frame of the conducting material are arranged substantially throughout the width or substantially throughout the length of the cover foils of the card.

2. A card as claimed in claim 1, wherein one or several portions of the frame protrude(s) beyond the periphery of one, or of the two cover foils.

3. A card as claimed in claim 1, wherein the frame comprises two sub-frames which are attached together.

4. A card as claimed in claim 3, wherein one of the sub-frames is sealed to said first cover foil and the other sub-frame is sealed to said second cover foil.

5. A card as claimed in claim 3, wherein the electric battery is constituted by an electrochemical cell including two flat electrodes.

6. A card as claimed in claim 2, comprising at least two electric battery elements arranged substantially parallel in the cavity of the frame and having one common electrode of the same polarity.

7. A card as claimed in claim 6, wherein flat battery elements are separated in an impervious manner by an insulating foil attached to inner surfaces, which face said cavity, of the parts of the frame made of the conducting material.

8. A card as claimed in claim 7, wherein the electrodes of opposite polarity of the flat battery elements are sealed to the parts of conducting material of the frame, and wherein two facing parts of conducting material of the frame corresponding to the two adjacent battery elements are electrically connected for connecting the two battery elements in series.

9. A card as claimed in claim 1, wherein the battery element(s) is (are) rechargeable.

10. A card as claimed in claim 9, wherein the battery element(s) is (are) of lead-acid.

11. A card as claimed in claim 10, wherein one of the cover foils has a locally thinner portion for safety purposes.

12. A card as claimed in claim 10, having an exhaust at the location of a seal between two parts of said thin card.

13. A battery comprising:

a frame having conducting parts which are separated by insulating parts to form a cavity;

a cell located in said cavity having electrodes connected to said conducting parts; and an insulating cover foil which covers said cell, said conducting parts extending substantially along two sides of said frame.

14. The battery of claim 13, further comprising an insulating foil located over inner surfaces of said conducting parts, said inner surfaces facing toward said cavity.

15. A battery comprising:

a frame having conducting parts which are separated by insulating parts to form a cavity;

a plurality of cells having electrodes connected to said conducting parts and inter-connected electrodes; and an insulating cover foil which covers said plurality of cells, said plurality of cells being vertically stacked over one another in said cavity.

16. The battery of claim 15, wherein said inter-connected electrodes connect said plurality of cells in parallel.

17. The battery of claim 15, wherein said inter-connected electrodes connect said plurality of cells in series.

* * * * *